United States Patent
Ohashi

(10) Patent No.: US 11,263,651 B2
(45) Date of Patent: *Mar. 1, 2022

(54) REWARD GIVING METHOD, COMPUTER-READABLE RECORDING MEDIUM, SERVER DEVICE, AND GAME SYSTEM

(71) Applicant: GREE, INC., Tokyo (JP)

(72) Inventor: Keiya Ohashi, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,125

(22) Filed: Sep. 17, 2019

(65) Prior Publication Data

US 2020/0013081 A1  Jan. 9, 2020

Related U.S. Application Data

(63) Continuation of application No. 14/325,365, filed on Jul. 7, 2014, now Pat. No. 10,453,085.

(30) Foreign Application Priority Data

Sep. 27, 2013  (JP) .................................. 2013-202448

(51) Int. Cl.
*G06Q 30/00* (2012.01)
*G06Q 30/02* (2012.01)
(Continued)

(52) U.S. Cl.
CPC ......... *G06Q 30/0209* (2013.01); *G06Q 30/02* (2013.01); *G06Q 30/0269* (2013.01);
(Continued)

(58) Field of Classification Search
CPC .............. G06Q 30/0209; G06Q 30/02; G06Q 30/0269; G06Q 30/0277; G06Q 50/01; G07F 17/3262

See application file for complete search history.

(56) References Cited

U.S. PATENT DOCUMENTS 6,061,938 A * 5/2000 Young .................... G09F 11/00
116/321
7,780,525 B2 * 8/2010 Walker ................ G07F 17/3255
463/29

(Continued)

FOREIGN PATENT DOCUMENTS

JP   H08033770 A   2/1996
JP   2007117219 A   5/2007
(Continued)

OTHER PUBLICATIONS

Reeves; Leveraging the engagement of games to change energy behavior; IEEE 2012; pp. 354-358; 20112.*

(Continued)

*Primary Examiner* — Radu Andrei
(74) *Attorney, Agent, or Firm* — Oliff PLC

(57) ABSTRACT

A server device determines a first item number by specifying a first object correlated with an item number of items defined in a game and determines a change value by specifying a second object correlated with the change value for changing the first item number. The server device changes the first item number to a second item number on the basis of the determined first item number and the determined change value and gives a reward on the basis of the second item number.

21 Claims, 15 Drawing Sheets

(51) Int. Cl.
*G06Q 50/00* (2012.01)
*G07F 17/32* (2006.01)
(52) U.S. Cl.
CPC ......... *G06Q 30/0277* (2013.01); *G06Q 50/01* (2013.01); *G07F 17/3262* (2013.01)

(56) References Cited

U.S. PATENT DOCUMENTS

| | | | | |
|---|---|---|---|---|
| 8,970,453 | B2* | 3/2015 | Sasaki | G01C 21/365 |
| | | | | 345/8 |
| 9,519,402 | B2* | 12/2016 | Lee | G06F 3/0482 |
| 9,916,620 | B2* | 3/2018 | Vecchio | G06Q 40/02 |
| 9,933,912 | B2* | 4/2018 | Kuehne | G02B 27/0172 |
| 2004/0171423 | A1* | 9/2004 | Silva | G07F 17/3244 |
| | | | | 463/31 |
| 2007/0273926 | A1* | 11/2007 | Sugiyama | H04N 7/163 |
| | | | | 358/1.18 |
| 2007/0298875 | A1* | 12/2007 | Baerlocher | G07F 17/3262 |
| | | | | 463/27 |
| 2008/0108418 | A1 | 5/2008 | Sakuma | |
| 2009/0111575 | A1 | 4/2009 | Kim | |
| 2009/0117973 | A1 | 5/2009 | Suda et al. | |
| 2009/0124371 | A1* | 5/2009 | Gilmore | G07F 17/32 |
| | | | | 463/27 |
| 2010/0295795 | A1* | 11/2010 | Wilairat | G06F 3/04883 |
| | | | | 345/173 |
| 2011/0130182 | A1* | 6/2011 | Namba | A63F 13/42 |
| | | | | 463/3 |
| 2011/0271568 | A1* | 11/2011 | Vitale | H04N 5/64 |
| | | | | 40/455 |
| 2012/0202575 | A1 | 8/2012 | Matsuno | |
| 2013/0217484 | A1 | 8/2013 | Fujisawa et al. | |
| 2013/0260894 | A1* | 10/2013 | Graf | A63F 13/35 |
| | | | | 463/42 |
| 2013/0324256 | A1* | 12/2013 | Takagi | A63F 13/58 |
| | | | | 463/42 |
| 2014/0041423 | A1* | 2/2014 | Zuraski | E05B 37/0048 |
| | | | | 70/315 |
| 2014/0357339 | A1* | 12/2014 | Urushihara | G07F 17/329 |
| | | | | 463/17 |
| 2014/0359507 | A1* | 12/2014 | Kim | G06F 3/04845 |
| | | | | 715/769 |
| 2015/0082180 | A1* | 3/2015 | Ames | G06F 3/04815 |
| | | | | 715/738 |
| 2015/0148131 | A1* | 5/2015 | Owaku | A63F 13/33 |
| | | | | 463/31 |
| 2015/0371446 | A1* | 12/2015 | Kuehne | G02B 27/017 |
| | | | | 345/633 |
| 2017/0352331 | A1* | 12/2017 | Fujiwara | H04N 9/04 |

FOREIGN PATENT DOCUMENTS

| | | |
|---|---|---|
| JP | 2008119061 A | 5/2008 |
| JP | 2009112808 A | 5/2009 |
| JP | 2011067534 A | 4/2011 |
| JP | 5248707 B1 | 7/2013 |
| JP | 2013-165902 A | 8/2013 |
| JP | 2013162981 A | 8/2013 |

OTHER PUBLICATIONS

Reeves; Leveraging the engagement of games to change energy behavior; IEEE 2012; pp. 354-358; 2012.*

Staewen; Player characteristics and their relationship to golas and rewards in video games; IEEE 2014; 8 pages; 2014.*

Mar. 24, 2015 Office Action issued in Japanese Patent Application No. 2014-150547.

Nov. 6, 2015 Office Action issued in Japanese Patent Application No. 2014-150547.

Oct. 25, 2016 Office Action issued in Japanese Patent Application No. 2015-181133.

"Dragon's Kingdom Beginner Manual: Collect cards and create an unbeatable Union!," website of "AppBank," <http://www.appbank.net/2012/07/30/iphone application/447455.php>, AppBank, Jul. 30, 2012.

"Powerful Pro Baseball TOUCH 2012: Enjoy PowerPro with just a tap! Also compatible for Bluetooth matches!," website of AppBank, <http://www.appbank.net/2012/03/22/iphone-application/387146.php>, AppBank, Mar. 22, 2012.

Nishino, H; A Touch Screen Interface Desing with Tactile Feedback; 2011 IEEE/ICCI, p. 53-60; 2011.

Shibata, T; Development and Integration of Generic Components for a Teachable Vision-Based Mobile Robot; IEEE 1996, p. 239-236; 1996.

Apr. 24, 2014 Office Action issued in Japanese Patent Application No. 2013-202448.

Jun. 16, 2015 Office Action issued in Japanese Patent Application No. 2014-150547.

Dec. 2, 2013 Office Action issued in Japanese Patent Application No. 2013-202448.

* cited by examiner

| TICKET NUMBER STORAGE UNIT ||
|---|---|
| NUMBER OF RED TICKETS | NUMBER OF BLUE TICKETS |
| THREE | ZERO |

| BOOK NUMBER STORAGE UNIT ||
|---|---|
| RED BOOK | BLUE BOOK |
| 150 BOOKS | 15 BOOKS |

| NUMBER OF BOOKS (RED) | REWARD (RED) |
|---|---|
| 100 BOOKS | ITEM A |
| 200 BOOKS | ITEM B |
| 300 BOOKS | ITEM C |
| 400 BOOKS | LEVEL-UP |
| ⋮ | ⋮ |

44B

| NUMBER OF BOOKS (BLUE) | REWARD (BLUE) |
|---|---|
| 100 BOOKS | RARE ITEM D |
| 200 BOOKS | SKILL-UP |
| ⋮ | ⋮ |

REWARD GIVING METHOD, COMPUTER-READABLE RECORDING MEDIUM, SERVER DEVICE, AND GAME SYSTEM

This application is a Continuation of U.S. Ser. No. 14/325,365 filed Jul. 7, 2014, which is based upon and claims the benefit of priority from JP 2013-202448 filed Sep. 27, 2013, the entire contents of the prior applications being incorporated herein by reference.

BACKGROUND

Disclosed herein are a reward giving method, a computer-readable recording medium, a server device, and a game system.

In recent years, games provided from a server device to mobile terminals, which are operated by players, via a communication network have gained more popularity and a lot of game titles are released from plural platforms. The types or categories of these games are diverse and so-called social games enabling plural players to participate in the same game have boomed among these games. Such social games can be said to use a community type network service called social networking service (hereinafter, referred to as "SNS").

As such social games utilizing characteristics of the SNS, for example, social games are known in which a matchup event such as a battle in which characters operated by plural players (player characters) make an attack on one or more enemy characters may break out. In this case, each player can receive various rewards by participating in the matchup event as a member of a specific group such as a guild (party, team, community) to be described later and defeating an enemy character.

Such a matchup event aimed at causing plural player characters to defeat an enemy character is also typically called a "raid battle" in the field of social games. In a raid battle, for example, when an enemy character (raid boss) is defeated, a predetermined reward is dropped depending on the level or type of the raid boss. This reward is given to, for example, a player character damaging the raid boss to a certain degree or more. In the field of social games, the direct matchup between groups is typically called a "guild battle" or is called "GvG" using the initial letter (G) in English of a group or a guild as described above.

JP2013-162981A discloses that when an opposing user drawn as an opponent wins a battle executed by the opposing user, a reward (for example, an item such as a medicine) is given to the opposing user.

SUMMARY

In a reward giving structure of a game having the raid battle as an event, when a raid boss is defeated, a predetermined reward is given, for example, in accordance with the above-mentioned rule. In the technique described in JP2013-162981A, a reward is given to a user having defeated an opposing user.

However, even though the above-mentioned reward giving structure can be easily understood, it is a simple structure, thereby causing troubles. For example, in accordance with the above-mentioned rule, when a strong player character and a weak player character are present in the same guild and a raid boss in a raid battle is defeated, a situation in which the strong player character can surely get a reward but the weak player character can rarely get a reward may occur. Then, the difference between the strong player character and the weak player character further increases and thus the player operating the weak player character gradually loses a desire to participate in the game. This situation causes the player to keep away from the game.

For example, in a structure in which a user defeating an opposing user gets a reward, when the user belongs to a weak guild or when a guild includes a lot of players poor at battle, the guild can rarely win and can rarely get a reward.

As described above, in the technique of the related art, since the reward giving structure is simple, the reward getting method is not flexible. Accordingly, there is a demand for a structure capable of giving a reward to more players. The value of a reward is lowered by only increasing the opportunity of getting the reward, and thus the game itself is not interesting. As a result, players keep away from the game.

Therefore, the invention disclosed herein is made in consideration of the above-mentioned circumstances and an object thereof is to provide a reward giving method, a computer-readable recording medium, a server device, and a game system that can give flexibility to a structure for allowing a player to get a reward and that can enhance a larger number of players' desire to get a reward.

According to an embodiment of the invention disclosed herein, there is provided a reward giving method of causing a computer to perform: a first item number determining step of determining a first item number by specifying a first object correlated with an item number of items defined in a game; a change value determining step of determining a change value by specifying a second object correlated with the change value for changing the first item number; an item number changing step of changing the first item number to a second item number on the basis of the determined first item number and the determined change value; and a reward giving step of giving a reward on the basis of the second item number.

According to another aspect of the invention disclosed herein, there is provided a server device that is connected to an information processing device operated by a player so as to communicate therewith and that provides a game to the information processing device, comprising: first item number determining unit for determining a first item number by specifying a first object correlated with an item number of items defined in a game; change value determining unit for determining a change value by specifying a second object correlated with the change value for changing the first item number; item number changing unit umber on the basis of the determined first item number and the determined change value; and reward giving unit for giving a reward on the basis of the second item number.

According to still another aspect of the invention disclosed herein, there is provided a computer-readable recording medium having a program recorded thereon for causing a computer to perform: a first item number determining function of determining a first item number by specifying a first object correlated with an item number of items defined in a game; a change value determining function of determining a change value by specifying a second object correlated with the change value for changing the first item number; an item number changing function of changing the first item number to a second item number on the basis of the determined first item number and the determined change value; and a reward giving function of giving a reward on the basis of the second item number.

The "reward" generally comprises an item having an effect causing each player or a group including the player, for example, in a matchup event which is an inter-group event to be superior to an opposing group of a matchup or an opposing player belonging to the opposing group in progressing a game, or an item having an effect of enhancing a value or a value system by possession of the item. Typically, the type of the reward is not particularly limited, and examples thereof include items (including values of parameters such as points) enhancing attack power of a player, items enabling a player to recover physical strength or damage, and items in which a value or characteristic such as rarity is set.

According to the aspects of the invention disclosed herein, it is possible to provide a reward giving method, a computer-readable recording medium, a server device, and a game system that can give flexibility to a structure for allowing a player to get a reward so as to enhance a larger number of players' desire to get a reward that can enhance an interest in a game.

BRIEF DESCRIPTION OF THE DRAWINGS

FIG. 4 is a diagram illustrating an example of a ticket number storage unit according to the embodiment;

FIG. 5 is a diagram illustrating an example of a book number storage unit according to the embodiment;

FIG. 6 is a diagram illustrating an example of a reward setting storage unit according to the embodiment;

DETAILED DESCRIPTION

Figure 1:
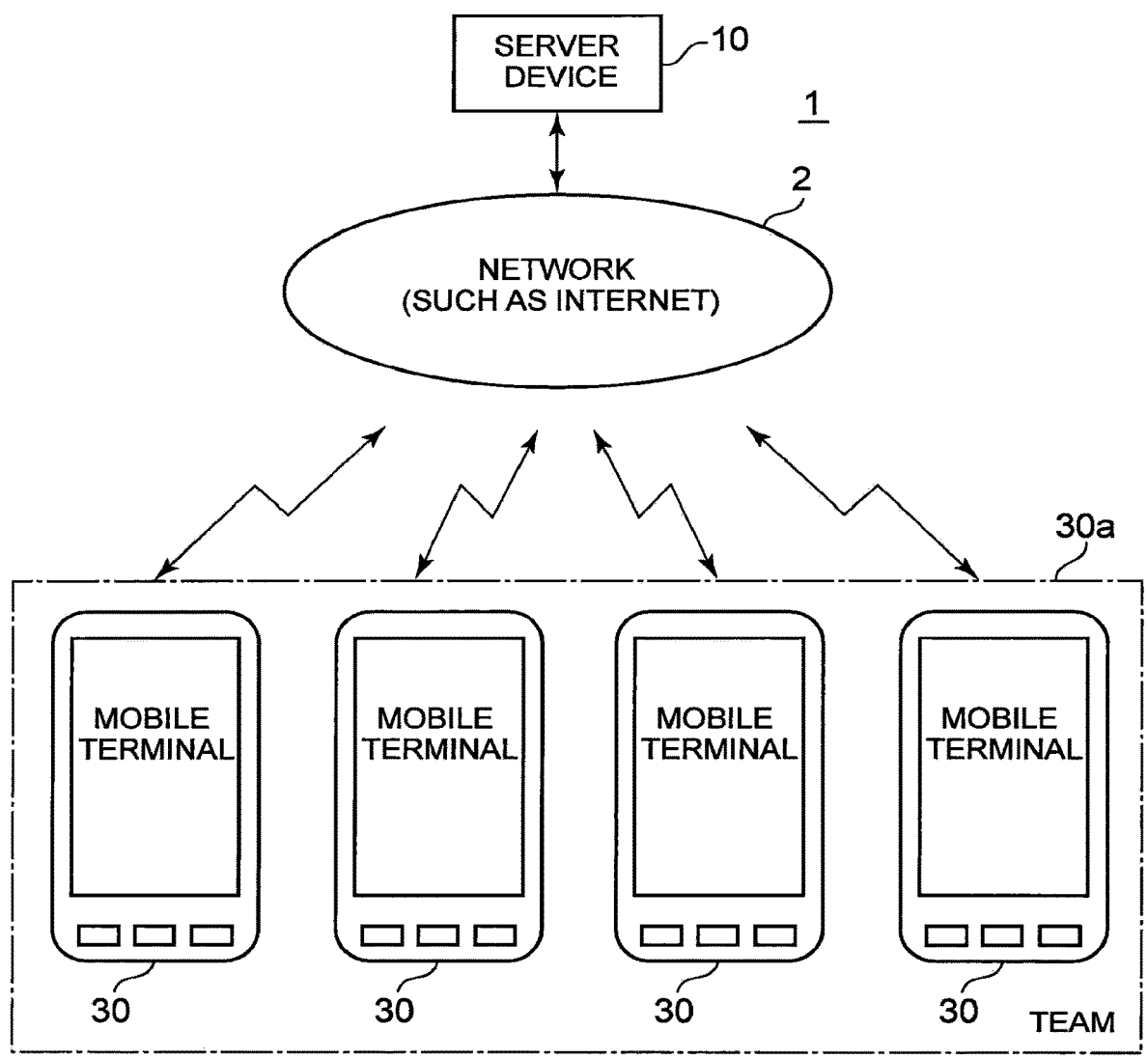
FIG. 1 is a diagram schematically illustrating a configuration of a game system according to an embodiment of the invention.

Hereinafter, an embodiment of the invention will be described in detail. The below-described embodiment is only an example and is not intended to limit the invention disclosed herein. The invention can be modified in various forms without departing from the gist thereof. Those skilled in the art can suppose embodiments in which elements to be described below are replaced with equivalents, and these embodiments are also comprised in the scope of the invention. The positional relations such as up, down, right, and left described if necessary are based on illustration of the drawings, as long as not mentioned differently. The dimensional ratios in the drawings are not limited to the illustrated ratios.

FIG. 1 is a diagram illustrating a configuration of a game system 1. As illustrated in FIG. 1, the game system 1 comprises a server device (computer) 10 and four mobile terminals (computer, information processing device) 30. The server device 10 is connected to four mobile terminals 30 via a network 2 such as the Internet (including access points of a wireless LAN or base stations of a mobile phone), and these four mobile terminals 30 constitute one team 30a that progresses a matchup game provided from the server device 10. Here, the matchup game is such a type of game in which a player alone generally progresses the game and progresses the game in cooperation with other players of the team 30a when a raid battle breaks out. In this embodiment, one team comprises four mobile terminals 30, but is not limited to this number of mobile terminals. For example, a game may be progressed with a single mobile terminal 30 depending on the details of the matchup game. In case of this type of matchup game, the matchup game is provided to one mobile terminal 30. The team 30a may comprise only personal computers of a stationary type or may comprise personal computers and mobile terminals 30.

First, the server device 10 will be described below.

Figure 2:
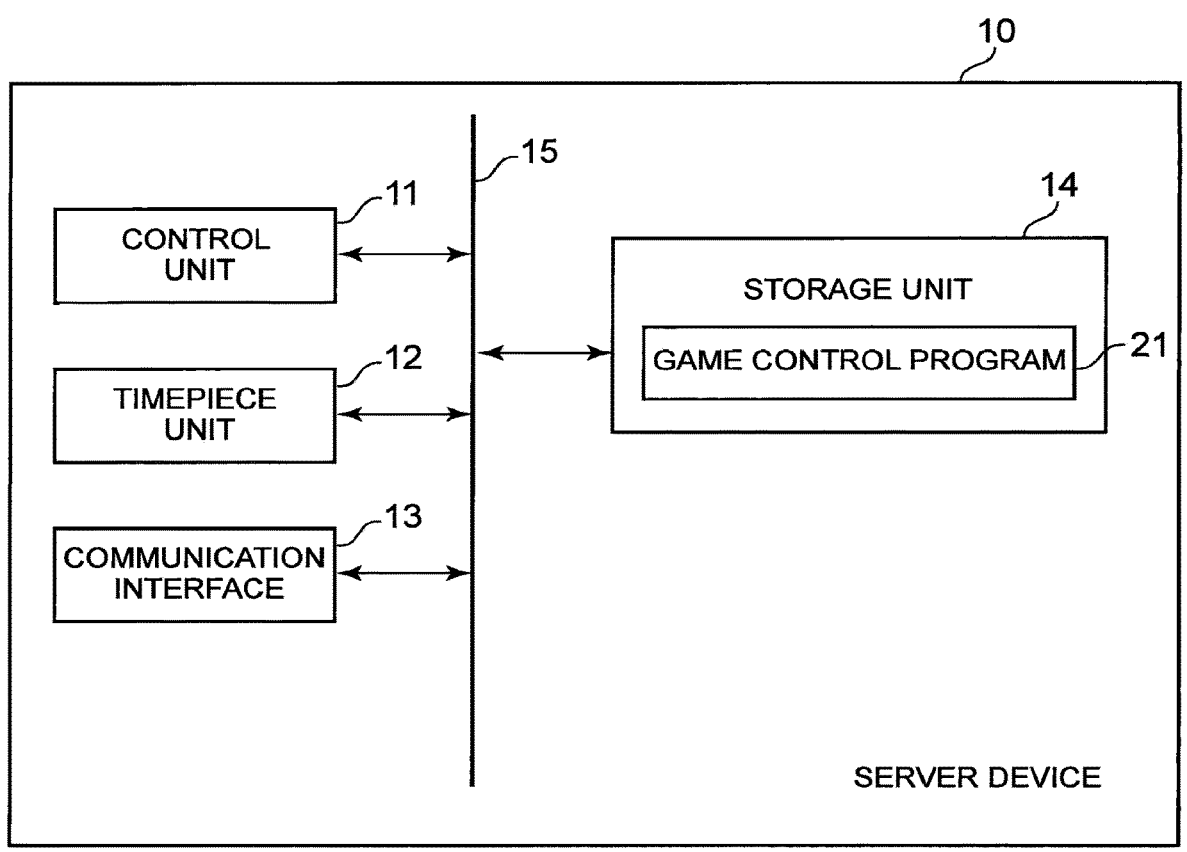
FIG. 2 is a diagram schematically illustrating a configuration of a server device according to the embodiment.

FIG. 2 is a diagram illustrating a configuration of the server device 10. As illustrated in FIG. 2, the server device 10 comprises a control unit 11, a timepiece unit 12, a communication interface 13, and a storage unit 14 which are connected to each other via a bus line 15.

The control unit 11 comprises a CPU, a ROM, and a RAM, and is configured to implement a function of performing processes relevant to giving of a reward in addition to a function of a general web server by executing an application or the like stored in the storage unit 14. The timepiece unit 12 generates time information and date information. The communication interface 13 controls communications with the mobile terminals 30 via the network 2. The storage unit 14 comprises, for example, plural large-capacity HDDs and stores a game control program 21 as well as storing applications and data (not illustrated) for implementing the function of a general web server.

The game control program 21 is a web application for implementing the matchup game and is a program of performing predetermined processes in response to a request from the mobile terminal 30 and returning the process results to the mobile terminal 30.

The mobile terminal 30 will be described below.

Figure 3:
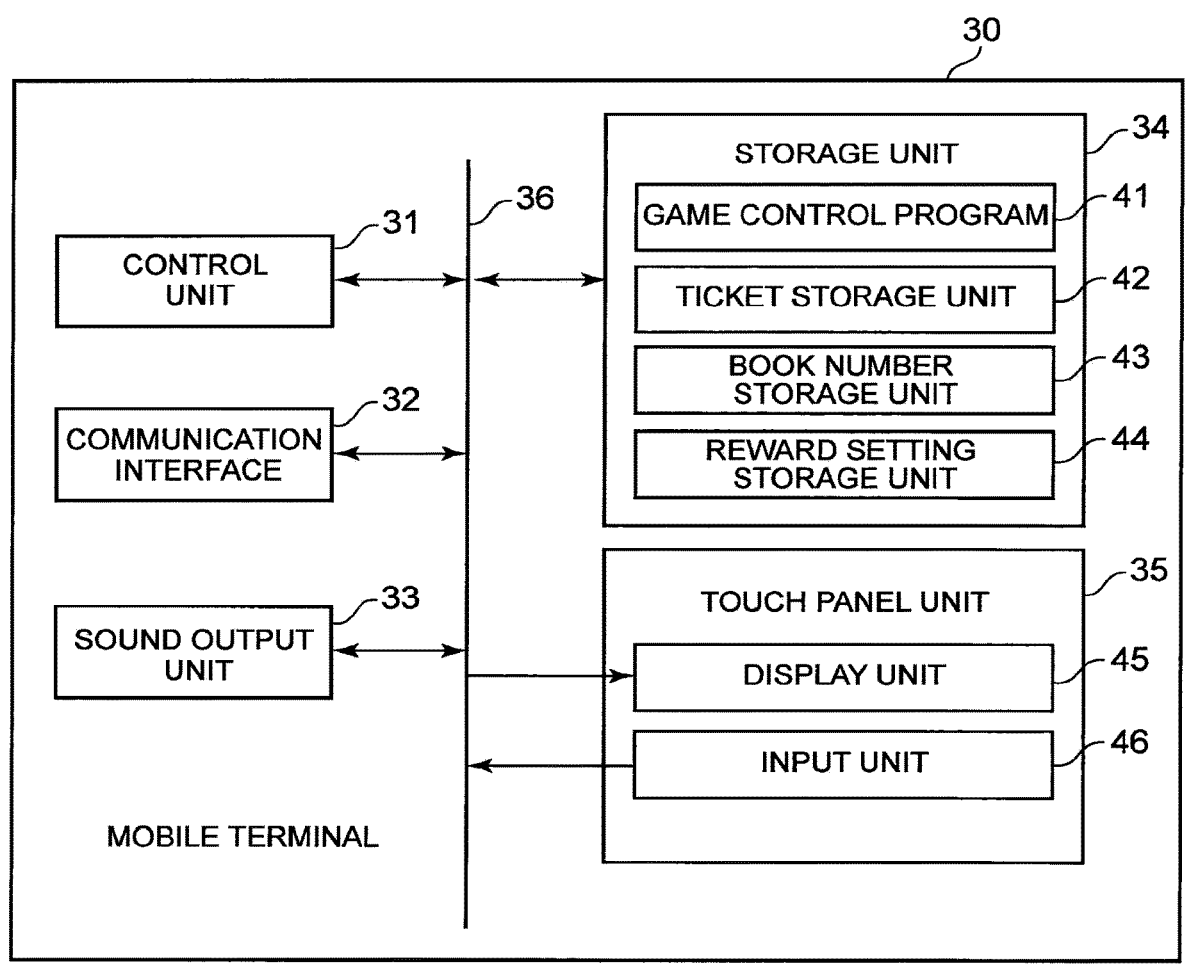
FIG. 3 is a diagram schematically illustrating a configuration of a mobile terminal according to the embodiment.

FIG. 3 is a diagram illustrating the configuration of the mobile terminal 30. As illustrated in FIG. 3, the mobile terminal 30 comprises a control unit 31, a communication interface 32, a sound output unit 33, a storage unit 34, and a touch panel unit 35 which are connected to each other via a bus line 36.

The control unit 31 comprises a CPU, a ROM, and a RAM, and is configured to implement a function of processing the matchup game in addition to a function of a general web client by executing an application or the like stored in the storage unit 34. The communication interface 32 controls communications with the server device 10 via the network 2. The storage unit 34 comprises, for example, plural small-size HDDs and stores a game control program 41 as well as storing applications and data (not illustrated) for implementing the function of a general web client. The storage unit 34 comprises a ticket storage unit 42, a book number storage unit 43, and a reward setting storage unit 44.

The game control program 41 is a native application for implementing the matchup game and is a program of transmitting a request to the server device 10, receiving a response to the request, and performing a process based on the response. In this embodiment, the process (function) relevant to giving of a reward to be described later is implemented by executing the native application. Details of the reward giving process will be described later.

The ticket storage unit 42 stores the number of red tickets got and the number of blue tickets got. The red ticket is a ticket that a player gets in events occurring constantly, for example, a ticket got when a player logs in to the matchup game, when the player wins the matchup game with another team, and when a boss character is defeated, or a ticket got from a treasure box found out on a quest. More specifically, for example, when a player wins the matchup game with another team and when a boss character is defeated, all player characters of the team 30a get one red ticket. In another method, for example, a player character damaging an opponent to a predetermined degree or more may get one red ticket, or all or arbitrary player characters of the team 30a may get one red ticket and then a player character damaging an opponent to a predetermined degree or more may further get red tickets on the basis of the degree of damage. The quest is cleared, for example, when a player character searches for a treasure box or goes ahead while repeatedly fighting against a boss character and defeats a raid boss in a raid battle which is given as a task.

The blue ticket is a ticket got by a player in a specific event, for example, when a raid boss is defeated in a raid battle. For example, when a raid boss is defeated in a raid battle, a player character damaging the raid boss to a predetermined degree or more gets one blue ticket. In this embodiment, it is preferable that the limitation of damaging the raid boss to a predetermined degree or more be set to be as low as possible. Accordingly, more player characters participating in the raid battle can get the blue ticket and the reward giving process can be performed for the blue ticket.

Therefore, players relatively easily get the red tickets but have relative difficulty in getting the blue tickets. FIG. 4 is a diagram illustrating an example of the ticket storage unit 42. In FIG. 4, three red tickets and 0 blue tickets are stored in the ticket storage unit 42. In this embodiment, the item of "ticket" is used, but the invention is not limited to the item form of "ticket".

The book number storage unit 43 stores the number of red books got on the basis of the red tickets and the number of blue books got on the basis of the blue tickets. Here, the "book" is an item used to get a reward set in the matchup game, but the invention is not limited to the item form of book. As the types of the "book", red books and blue books corresponding to the red tickets and the blue tickets are provided in this embodiment, but the invention is not limited to these types of books. FIG. 5 is a diagram illustrating an example of the book number storage unit 43. In FIG. 5, the book number storage unit 43 stores 150 red books and 15 blue books.

The reward setting storage unit 44 stores rule settings for giving a reward. In this embodiment, the reward (item, rare item, level-up, and skill-up) is set to be given depending on the types of books and the number of books that can be held by the players.

Figures 7, 8:
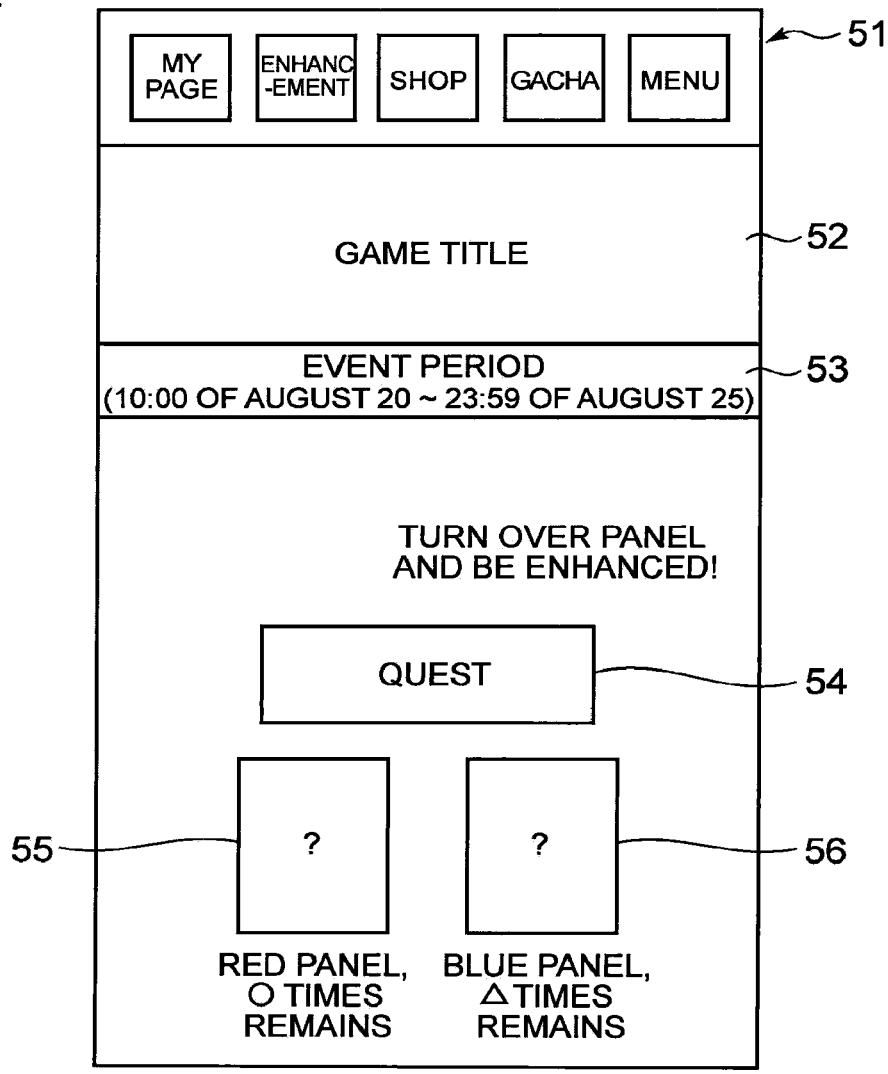
FIG. 7 is a diagram illustrating another example of the reward setting storage unit according to the embodiment.
FIG. 8 is a diagram illustrating an example of an event top screen according to the embodiment.

FIG. 6 is a diagram illustrating an example of a rule setting 44A of a reward to be given depending on the number of red books. In FIG. 6, a rule of 100 books for item A, 200 books for item B, 300 books for item C, 400 books for level-up, and the like is set. FIG. 7 is a diagram illustrating an example of a rule setting 44B of a reward to be given depending on the number of blue books. In FIG. 7, a rule of 100 books for rare item D, 200 books for skill-up, and the like is set. In this way, the items having low importance in events of the game and the level-up for improving parameters of the character are set as the rewards got on the basis of the red tickets that can be relatively easily got, and the rare items having high Importance in events of the game and the skill-up for getting a new technique are set as the rewards got on the basis of the blue tickets that are relatively difficult to get. In this way, the rewards are set to differ depending on the types of the books, thereby improving an interest in the game.

The touch panel unit 35 comprises a display unit 45 that gives a display to a player and an input unit 46 that receives an instruction from the player. For example, a player performs an operation for getting rewards while visually recognizing various screens (FIGS. 8 to 11 and FIGS. 14 to 17) for getting the rewards, which are displayed on the display unit 45.

An event top screen when a player performs an operation of getting a reward will be described below. FIG. 8 is a diagram illustrating an example of an event top screen 50 displayed on the display unit 45. The event top screen 50 is displayed when a player performs a predetermined operation on a game top screen (not illustrated). The event top screen 50 is automatically displayed after a quest ends when a player character gets at least one of the red ticket and the blue ticket in the quest.

As illustrated in FIG. 8, a button group (my page, enhancement, shop, gacha, menu) 51 for instructing a change to another screen, a game title 52 of the matchup game, an event period (10:00 of August 20~23:59 of August 25) 53 are displayed in the upper part of the event top screen 50. A quest button 54, a red panel button 55, and a blue panel button 56 are displayed on the lower side of the information (display function). When the quest button 54 is pressed by a player, a quest is executed. When the red panel button 55 or the blue panel button 56 are pressed by a player, the reward giving process based on the number of red books and the reward giving process based on the number of blue books are performed.

Figure 9:
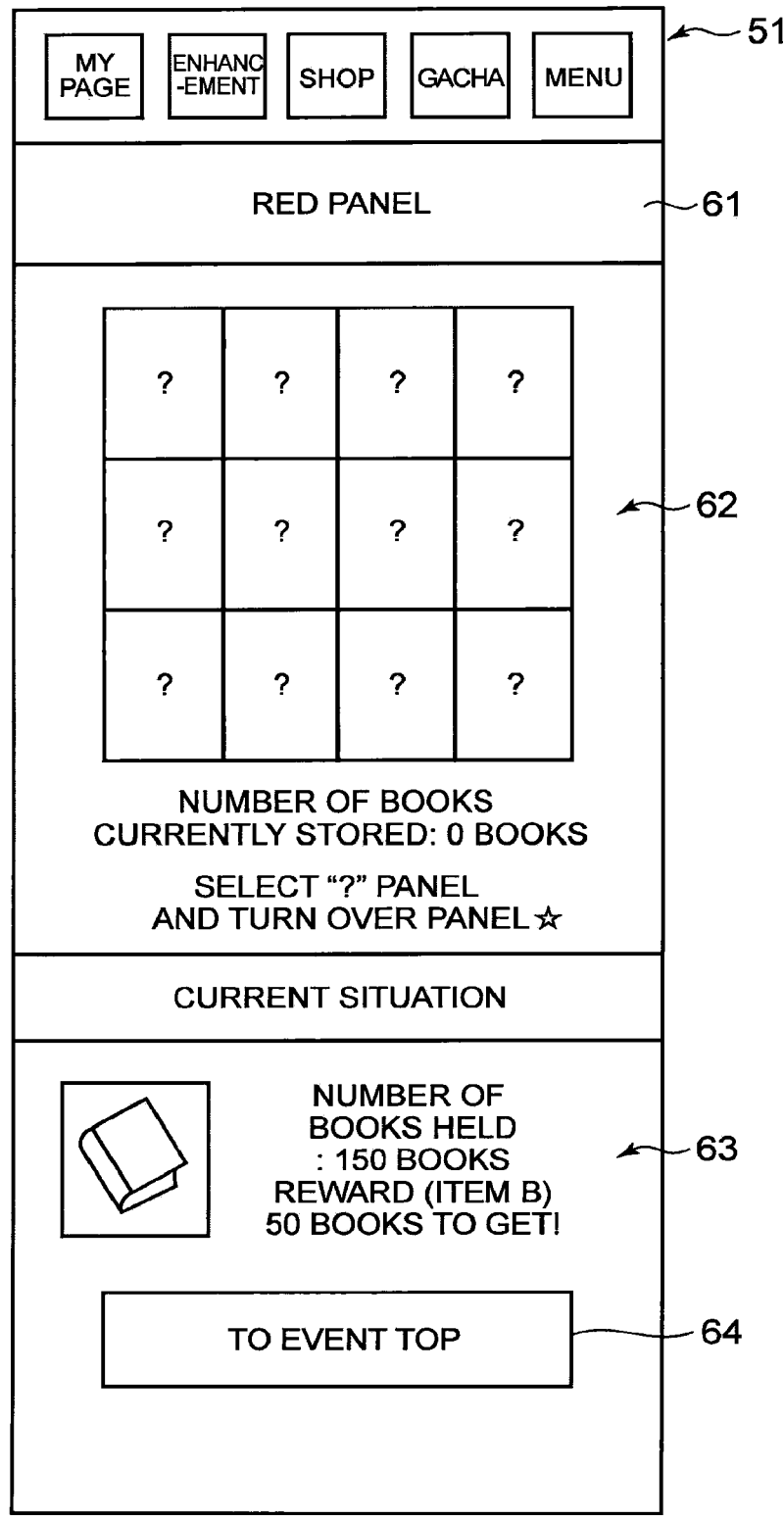
FIG. 9 is a diagram illustrating a display example of a book panel screen according to the embodiment.

A book panel screen to be displayed when the red panel button 55 is pressed will be described below. FIG. 9 is a diagram illustrating an example of a book panel screen 60 displayed on the display unit 45. On the book panel screen 60, a button group 51, a panel name (red panel) 61, a book panel (first object) 62, a message indicating a current situation (number of books held: 150 books, 50 books to get reward (item B)) 63, and an event top button 64 for instructing a change to the event top screen 50 are displayed. Here, 12 (3×4) book panels 62 are arranged. 10 book panels 62 among the 12 book panels 62 are correlated with a numerical value indicating any of 1 to 3 as the number of books. The other two book panels 62 are correlated with termination information indicating termination of the process of adding the number of books instead of the numerical value indicating any of 1 to 3. In this embodiment, when a player sequentially turns over the book panels 62 and turns over the panel correlated with a numerical value, the number of books is added. When the player turns over all the 10 book panels (that is, all the panels correlated with the numerical value) or when the player turns over the book panel 62 correlated with the termination information, the process of turning over the book panels 62 ends.

Figure 10:
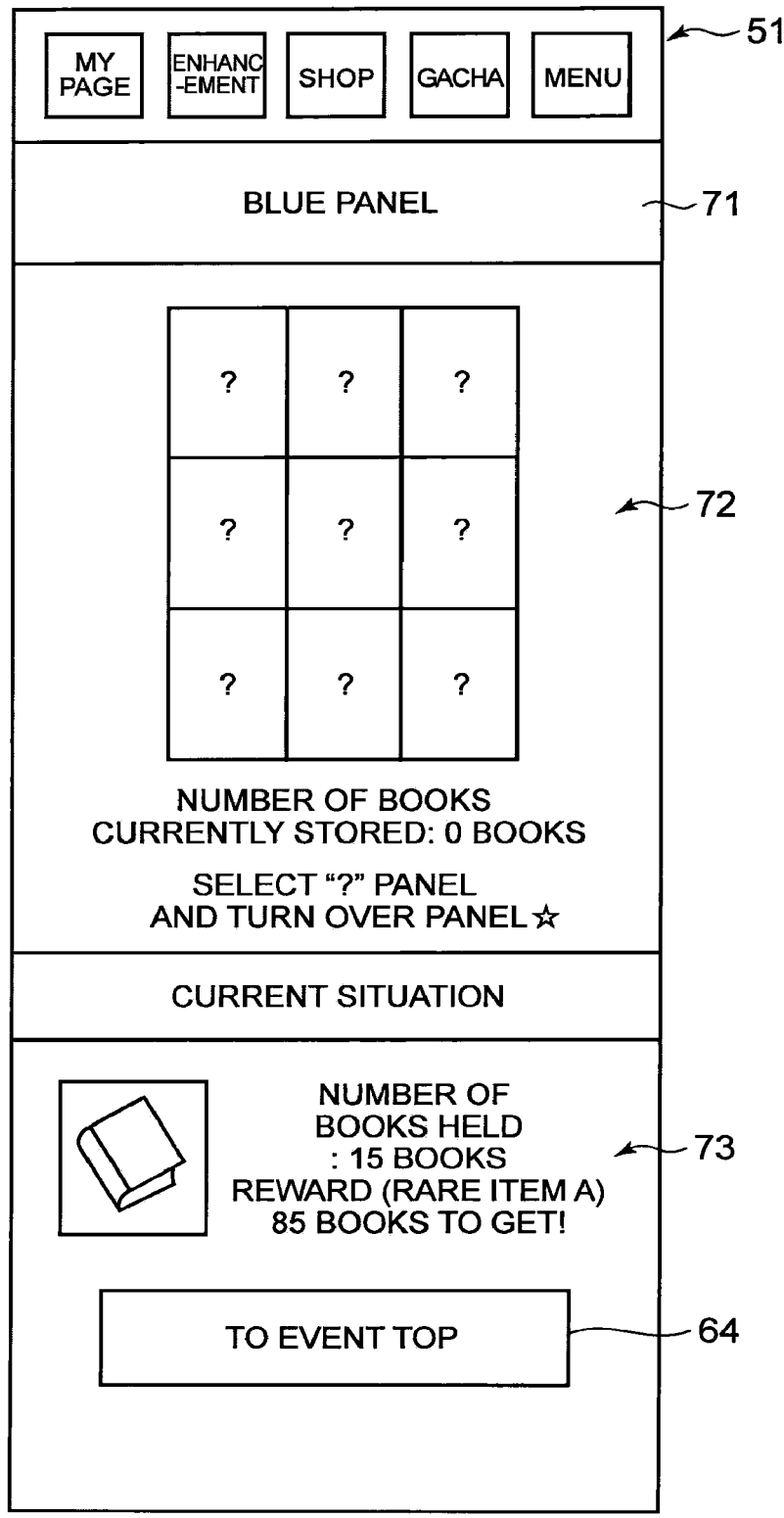
FIG. 10 is a diagram illustrating another display example of the book panel screen according to the embodiment.

A book panel screen displayed when the blue panel button 56 is pressed will be described below. FIG. 10 is a diagram illustrating an example of a book panel screen 70 displayed on the display unit 45. On the book panel screen 70, a button group 51, a panel name (blue panel) 71, a book panel (first object) 72, a message indicating a current situation (number of books held: 15 books, 85 books to get reward (rare item D)) 73, and an event top button 64 for instructing a change to the event top screen 50 are displayed. Here, 9 (3×3) book panels 72 are arranged. 7 book panels 72 among the 9 book panels 72 are correlated with a numerical value indicating any of 1 to 3 as the number of books. The other 2 book panels 72 are correlated with termination information indicating termination of the process of adding the number of books instead of the numerical value indicating any of 1 to 3. In this embodiment, similarly to the red panels, when a player sequentially turns over the book panels 72 and turns over the panel correlated with a numerical value, the number of books is added. When the player turns over all the 7 book panels (that is, all the panels correlated with the numerical value) or when the player turns over the book panel 72 correlated with the termination information, the process of turning over the book panels 72 ends.

As described above, the number of book panels 62 (12) in FIG. 9 and the number of book panels 72 (9) in FIG. 10 are different from each other. More specifically, the number of panels correlated with the numerical value in the blue panel 71 is 7 (<10) which is smaller than that in the red panel 61 and the ratio of the panels indicating the termination is greater like 2/9 (>2/12). Accordingly, the blue books are more difficult to get than the red books. As a result, depending on this setting and the setting in which the blue tickets are relatively difficult to get, the opportunity of giving a reward (the rare item or the skill-up) set for the blue books can be lowered, thereby maintaining the rarity.

Figure 11:
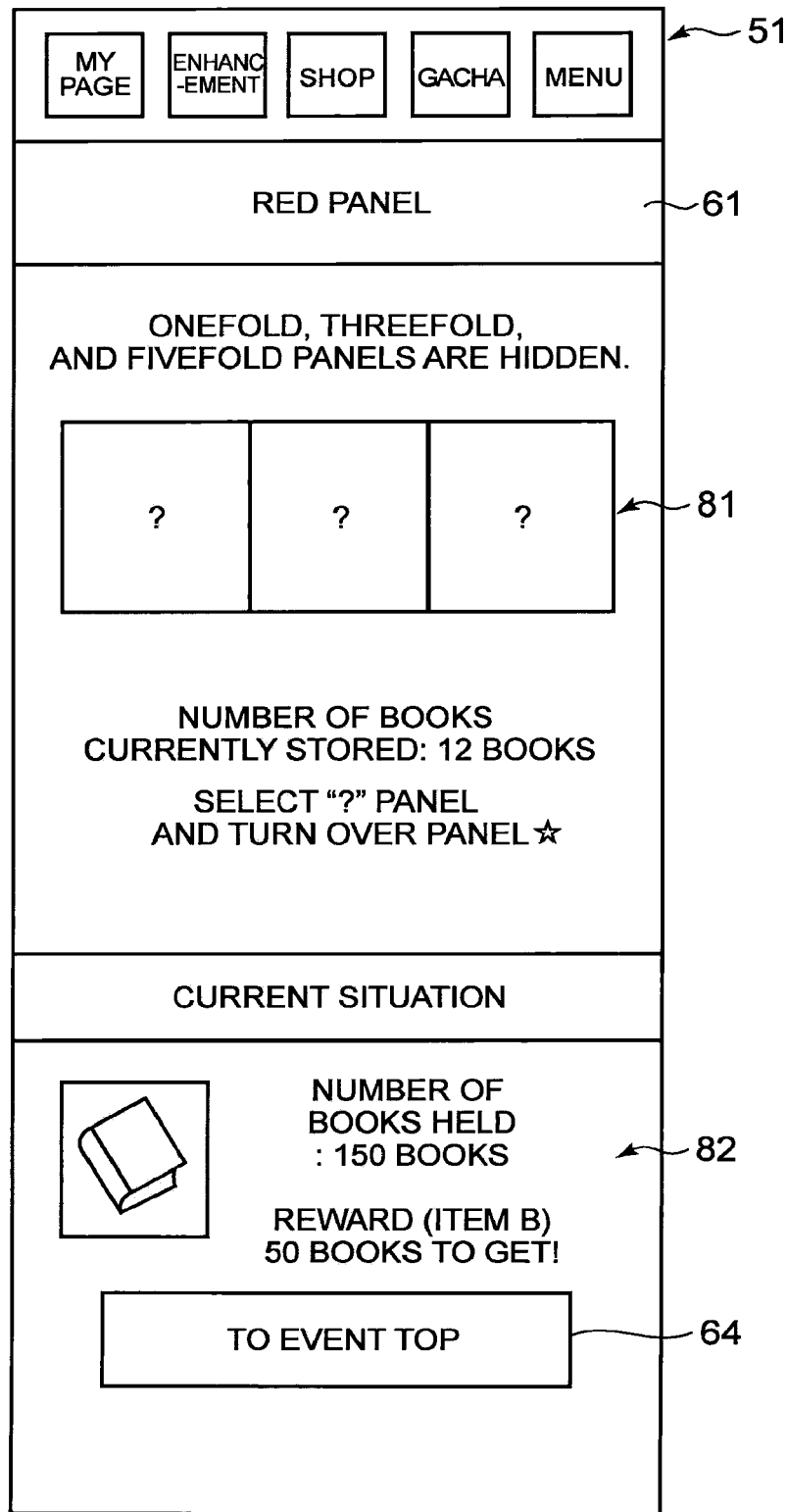
FIG. 11 is a diagram illustrating a display example of a chance-up panel screen according to the embodiment.

A chance-up panel (second object) displayed when the process of adding the number of books in the red panel 61 or the blue panel 71 ends will be described below. FIG. 11 is a diagram illustrating an example of a chance-up panel screen 80 displayed on the display unit 45.

As illustrated in FIG. 11, a button group 51, a panel name (red panel) 61, a chance-up panel 81, a message indicating a current situation (number of books held: 150 books, 50 books to get reward (item B)), and an event top button 64 are displayed on the chance-up panel screen 80. Here, three chance-up panels 81 are arranged. Each chance-up panel 81 is correlated with a change value for changing the number of books added in the book panel screen 70 or 80. In this embodiment, the numerical value multiplied by the number of books is set as the change value, and change values (onefold, threefold, fivefold) indicating three magnifications are set to correspond to three chance-up panels 81. These change values may be changed depending on details of the game or details of the reward. For example, change values of onefold, fivefold, and ninefold may be set for three chance-up panels 81, or the number of chance-up panels 81 may be increased to five and change values of onefold, twofold, threefold, fourfold, and fivefold may be correlated therewith. In this embodiment, the chance-up panel screen 80 with the same details is used for the added number of books using the book panels 62 and the book panels 72, but details (the number of chance-up panels or the magnification) displayed on the chance-up panel screen may be changed depending on the types of the books. It is described that the item correlated with the change value are applied to the chance-up panel 81, but the item correlated with the change value in the invention is not limited to the form of the chance-up panel 81.

Figure 12:
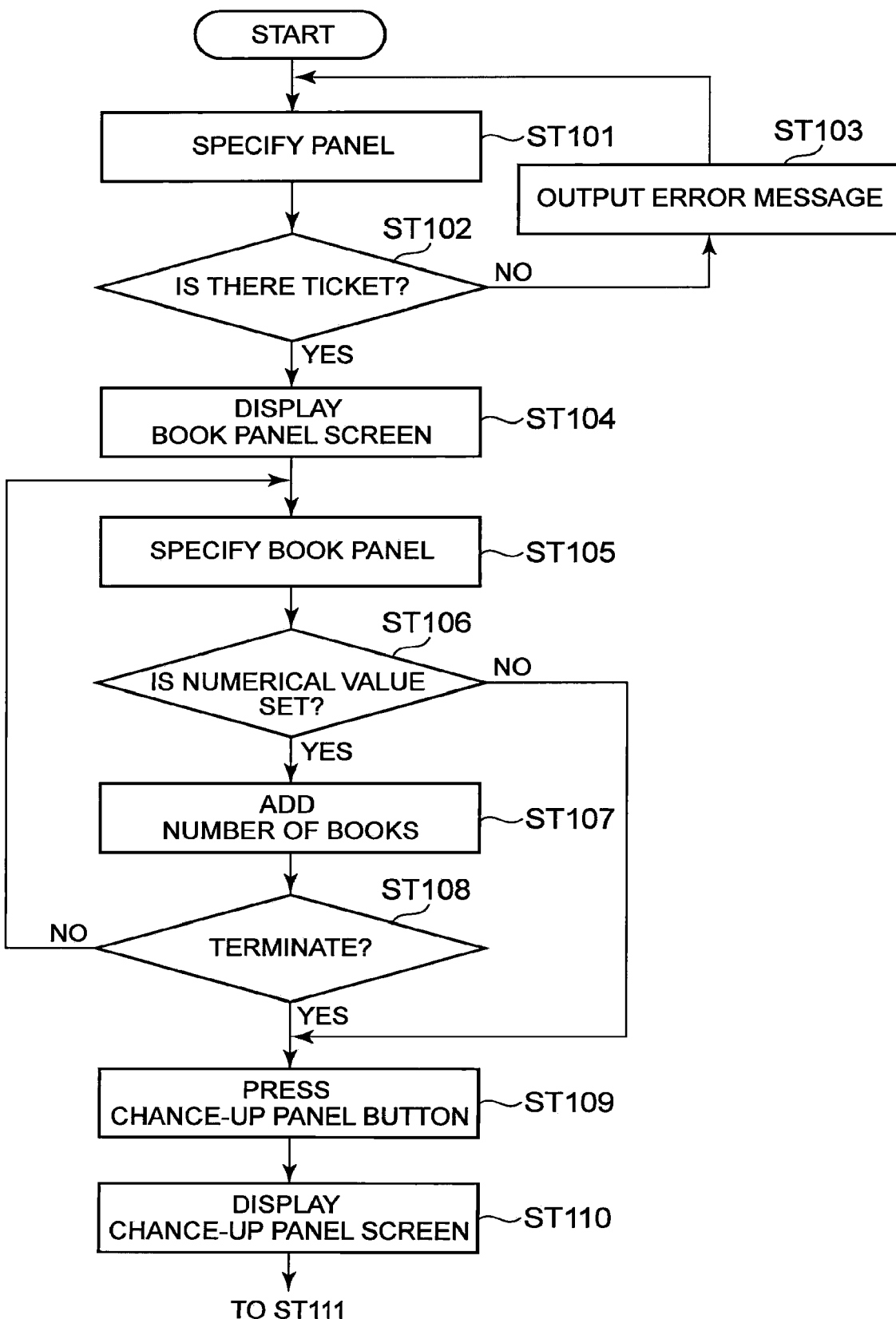
FIG. 12 is a flowchart illustrating an example of a reward giving process according to the embodiment.
Figure 13:
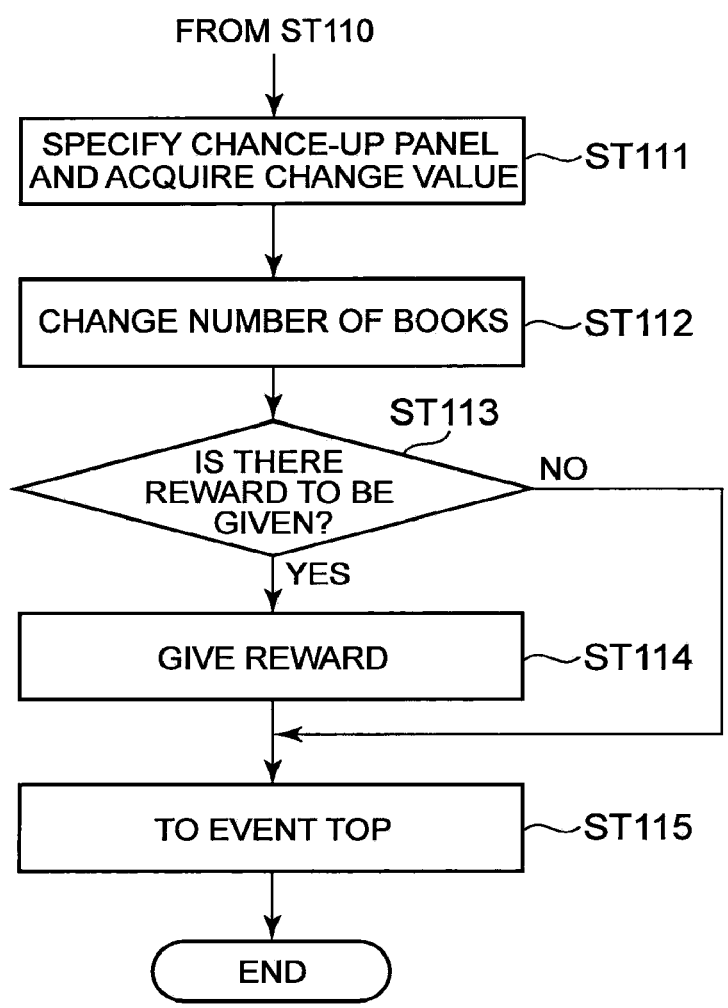
FIG. 13 is a flowchart illustrating an example of a reward giving process according to the embodiment.
Figure 14:
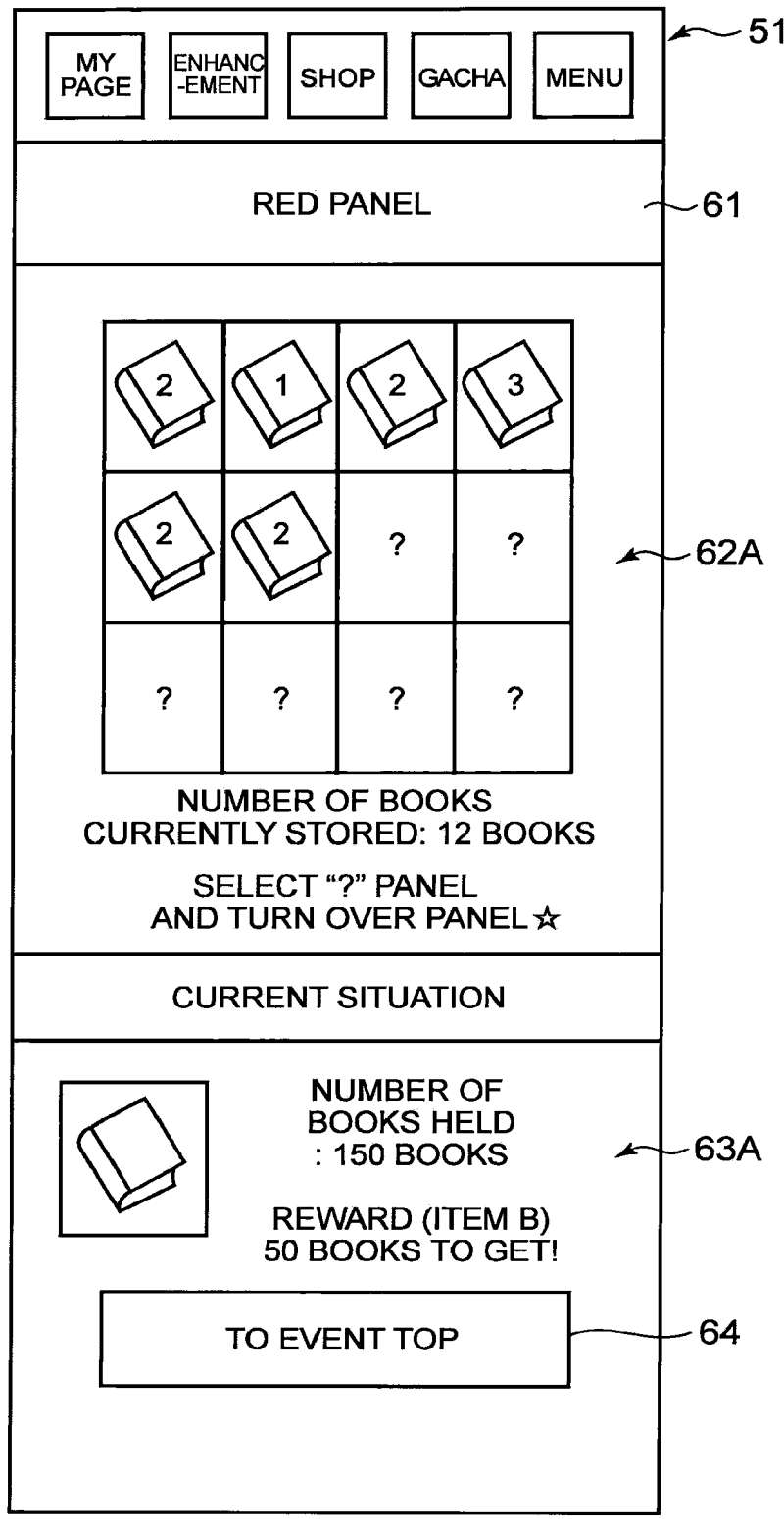
FIG. 14 is a diagram illustrating an example of a state where a book panel is turned over according to the embodiment.

The reward giving process will be described below with reference to the flowcharts of FIGS. 12 and 13 and the examples of the screen display of FIGS. 8 to 11 and FIGS. 14 to 17. The reward giving process is started when the red panel button 55 or the blue panel button 56 in the event top screen 50 is pressed by a player.

The control unit 31 specifies whether the panel pressed by the player is the red panel or the blue panel (ST101). Specifically, the pressed panel is the red panel when the red panel button 55 is pressed, and the pressed panel is the blue panel when the blue panel button 56 is pressed.

Then, with reference to the ticket storage unit 42, the control unit 31 determines whether a ticket corresponding to the specified panel is present in the ticket storage unit 42 (ST102). When the pressed panel is specified as the red panel in step ST101, it is determined whether a red ticket is present in the ticket storage unit 42. When the pressed panel is specified as the blue panel in step ST101, it is determined whether a blue ticket is present in the ticket storage unit 42. When it is determined that the ticket corresponding to the specified panel is not present (NO in ST102), the control unit 31 displays an error message indicating that there is no ticket on the display unit 24 (ST103) and performs the process of step ST101 again.

When it is determined that the ticket corresponding to the specified panel is present (YES in ST102), the control unit 31 displays the book panel screen corresponding to the type of the ticket (panel) on the display unit 45 (ST104). For example, the book panel screen 60 illustrated in FIG. 9 is displayed when the ticket is the red ticket (panel) and for example, the book panel screen 70 illustrated in FIG. 10 is displayed when the ticket is the blue ticket. For the purpose of simplification of explanation, an example where the book panel screen 60 is displayed to correspond to the red ticket will be described below.

Then, the control unit 31 specifies the book panel 62 selected by the player (ST105), and determines whether the specified book panel 62 is correlated with a numerical value (ST106). When it is determined that the specified book panel is the book panel 62 correlated with a numerical value (YES in ST106), the control unit 31 temporarily stores the numerical value, for example, in the RAM. Alternatively, when the numerical value is stored already, the present numerical value is added to the previous numerical value and the added numerical value is stored (ST107). For example, when six book panels 62 of "2", "1", "2", "3", "2", and "2" are turned over as illustrated on the book panel screen 60A of FIG. 14, 12, which is the numerical value obtained by sequentially adding the values, is stored as the added number of books in the RAM of the control unit 31. The information of the numerical value may be displayed as the number of books currently accumulated on the book panel screen 60A.

Then, the control unit 31 determines whether to terminate the process of adding the book panels 62 (ST108). This determination is performed on the basis of whether all the book panels 62 correlated with the numerical values are turned over. For example, in case of the red panel 61, the determination is performed on the basis of whether 10 book panels 62 are turned by the player. When it is determined that the process is not terminated (YES in ST108), the control unit 31 returns to step ST105 and repeats the subsequent processes.

On the other hand, when it is determined in step ST106 that the specified book panel is not correlated with a numerical value (NO in ST106), that is, when the termination information indicating the termination is correlated with the book panel 62, or when it is determined in step S108 that the process of adding the number of books is terminated (YES in ST108), the control unit 31 receives an input of the chance-up panel button 65 for instructing a change to the chance-up panel screen (ST109) and displays the chance-up panel screen 80 illustrated in FIG. 11 on the display unit 45 (ST110). For example, when the book panel 62 correlated with the termination information is selected in the state illustrated in FIG. 14, "x" is marked on the book panel 62 and the chance-up panel button 65 for instructing a change to the chance-up panel screen is displayed as illustrated in the book panel screen 60B of FIG. 15. When all the book panels 62 are turned over, the chance-up panel button 65 is newly displayed on the book panel screen 60A illustrated in FIG. 14. When the chance-up panel button 65 is pressed by the player, the chance-up panel screen 80 is displayed. The first item number determining function of the invention disclosed herein is implemented by causing the mobile terminal 30 to perform the processes of steps ST105 to ST108.

Then, the control unit 31 specifies the chance-up panel 81 selected by the player, acquires the change value correlated with the specified chance-up panel 81 (ST111: change value determining function), and multiplies the number of books accumulated (12 in the above-mentioned example) temporarily stored in the RAM by the acquired change value to change the number of books accumulated (ST112: item number changing function). For example, the number of books accumulated is changed from 12 to 36 when the change value is "threefold", and the number of books accumulated is changed from 12 to 60 when the change value is "fivefold". The changed number of books accumulated is reflected in the book number storage unit 43. "Onefold" the number of books accumulated reduces the interest in the game. Accordingly, by using a predetermined item (for example, onefold deleting item), the chance-up panel 81 correlated with onefold as the change value may be displayed in gray or may be turned over, so that the player cannot select the chance-up panel.

Then, the control unit 31 determines whether a reward to be given is present on the basis of the changed number of books accumulated with reference to the reward setting storage unit 44 (ST113). More specifically, the number of books in the book number storage unit 43 reflecting the changed number of books accumulated and the setting details of the reward setting storage unit 44 are used to determine whether a reward to be given is present. When it is determined that a reward to be given is present (YES in ST113), the control unit 31 performs a process of giving a reward to the player (ST114: reward giving function). For example, the control unit 31 inquires the player about whether the player desires to get the reward set in the reward setting storage unit 44, and gives the reward (item, level-up of the player character) and subtracts the number of books corresponding to the reward from the number of books stored in the book number storage unit 43 when the player desires to get the reward. The control unit 31 displays a message indicating that the player gets the reward on the display unit 45 in a pop-up manner.

When a reward is given in step ST114, or when it is determined in step ST113 that a reward to be given is not present (NO in ST113), the control unit 31 receives an input of the event top button 64 from the player, displays the event top screen 50 (ST115), and terminates this process flow.

A specific example of the processes of steps ST111 to ST114 will be described below with reference to FIGS. 16 and 17.

Figure 15:
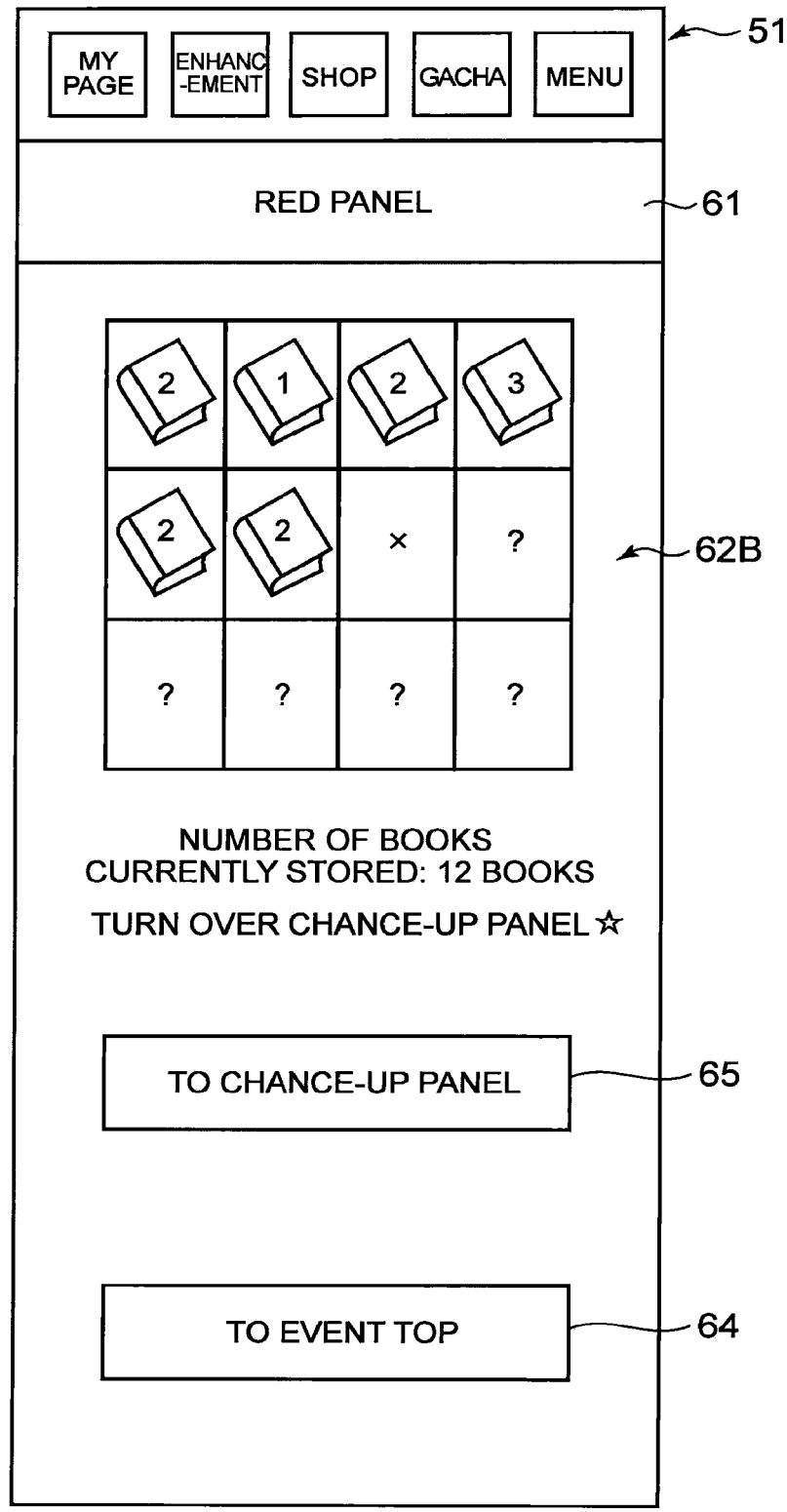
FIG. 15 is a diagram illustrating another example of the state where a book panel is turned over according to the embodiment.
Figure 16:
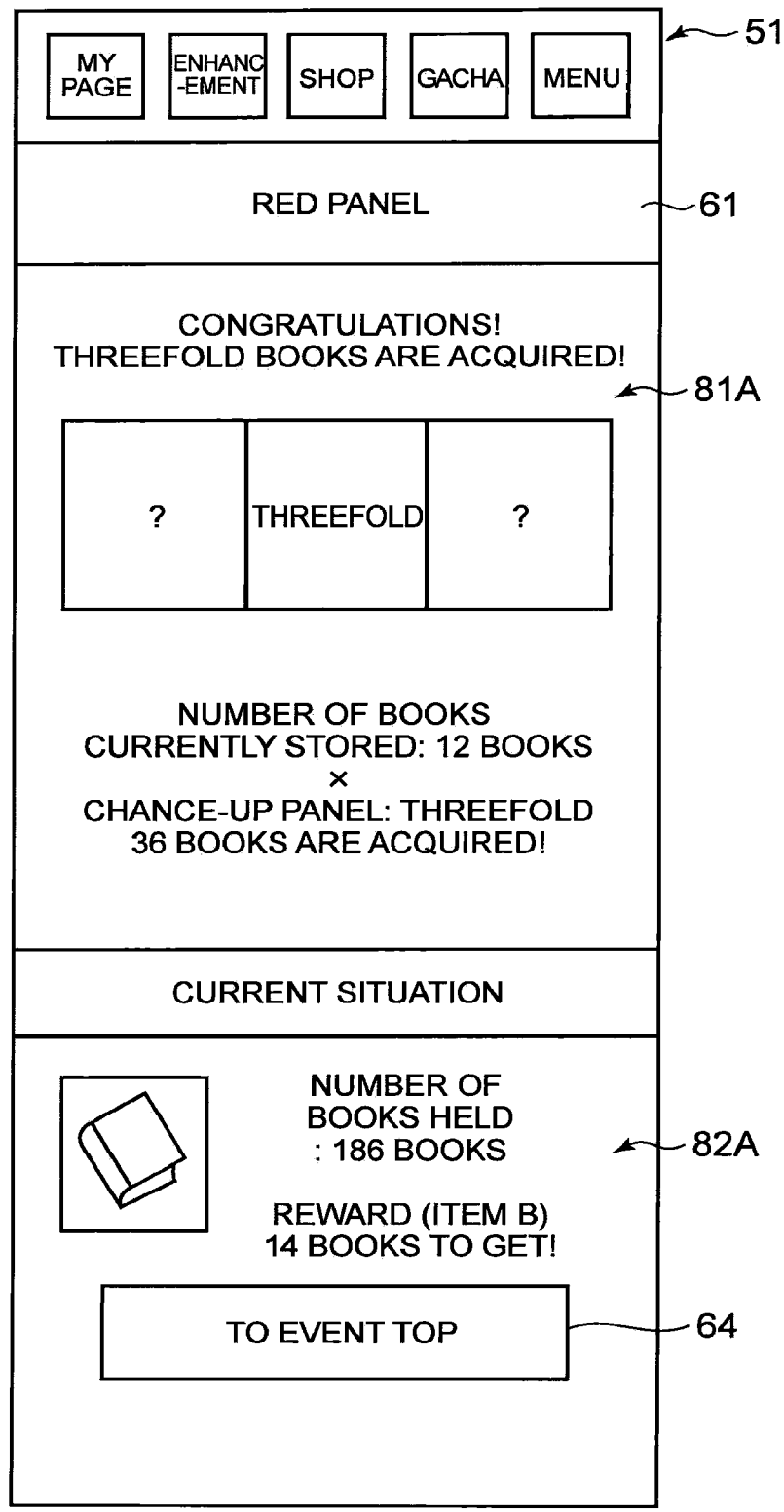
FIG. 16 is a diagram illustrating an example of a state where a chance-up panel is turned over according to the embodiment.

FIG. 16 illustrates an example of a chance-up panel screen 80A when the chance-up panel 81 correlated with "threefold" is selected by a player in the state (the number of books accumulated: 12 books) illustrated in FIG. 15. "Threefold" and a message of "number of books currently stored: 12 books×chance-up panel: threefold, 36 books are acquired!) are displayed on the chance-up panel 81 selected by the player. In addition, a message of "number of books stored: 186 books, 14 books to get reward (item B)!" is displayed as the current situation. In this case, since the number of red books stored does not reach the number of books set for giving a reward, the reward (item B) is not given.

Figure 17:
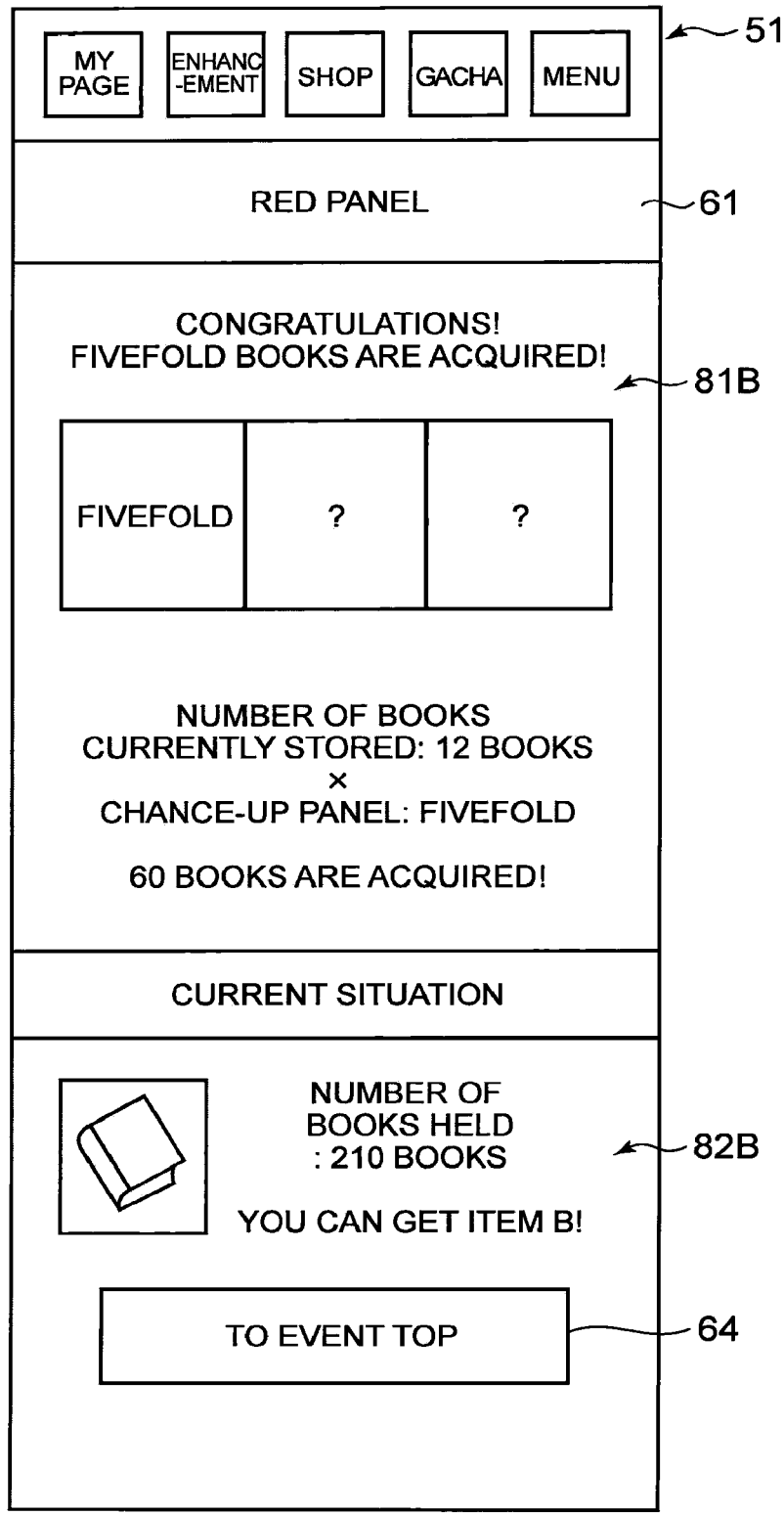
FIG. 17 is a diagram illustrating another example of the state where a chance-up panel is turned over according to the embodiment.

FIG. 17 illustrates an example of a chance-up panel screen 80B when the chance-up panel 81 correlated with "fivefold" is selected by a player in the state (the number of books accumulated: 12 books) illustrated in FIG. 15. "Fivefold" and a message of "number of books currently stored: 12 books×chance-up panel: fivefold, 60 books are acquired!) are displayed on the chance-up panel 81 selected by the player. In addition, a message of "number of books stored: 210 books, you can get item B!" is displayed as the current situation. When the player desires to get item B, the player can get the reward (item B) by performing a predetermined operation.

According to the game system 1 having the above-mentioned configuration, the number of books accumulated is first determined by causing the player to specify (select) the book panel 62 correlated with the number of books, and then the change value is determined by causing the player to specify (select) the chance-up panel 81 correlated with the change value for changing the number of books accumulated. The determined number of books accumulated is multiplied by the change value to change the number of books accumulated, and the reward set by the reward setting storage unit 44 can be given on the basis of the changed number of books accumulated, more specifically, on the basis of the details stored in the book number storage unit 43 reflecting the changed number of books accumulated. Accordingly, it is possible to give flexibility to the structure in which the player gets a reward. For example, depending on the methods of turning over the book panels 62 and the chance-up panels 81, a weak player character can have a larger number of times of getting of items or level-up than a strong player character and can have a larger number of times of acquisition of rare items having high rarity and skill-up, and it is thus possible to enhance a player's desire to get a reward, thereby enhancing an interest in the game.

When the number of books accumulated is determined, the game system 1 has a structure in which a predetermined number of book panels 62 are turned over among the plural book panels 62 and the numerical values correlated with the turned-over book panels 62 are added. Accordingly, a player can obtain enjoyment of turning over the book panels 62 and an interest in accumulating the number of books whenever the book panels 62 are turned over.

In the game system 1, the book panels 62 include the book panels 62 correlated with the termination information. By including the book panels 62 correlated with the termination information in the plural book panels 62, it is possible to enhance an interest in turning over the book panels 62.

In the game system 1, plural types of panels are provided such as the red panel 61 (book panels 62) and the blue panel 71 (book panels 72). Accordingly, a reward that is relatively easy to get and a reward that is relatively difficult to get can be separately set, thereby proposing a reward giving method in consideration of preference.

By displaying the red panel 61 and the blue panel 71 on the same screen, more specifically, on the event top screen 50 at the same time, a player can easily visually recognize that there are plural types of reward-giving events. At this time, when a ticket is not present, the panel corresponding to the ticket may not be displayed (or may be displayed in gray). By this setting, the player can visually recognize a panel with which a reward-giving event can be executed and the process of displaying an error message in step ST103 may be skipped.

In the above-mentioned embodiment, the reward setting is changed depending on the types of the ticket. However, in a game in which properties (for example, sun, wind, and lightning) are set, the reward setting may be changed depending on the properties in addition to the types of the ticket. By providing the reward setting for each attribute, it is possible to further consider preference and thus to enhance an interest in giving a reward.

The above-mentioned embodiment describes that the red books and the blue books are possessed for each player character, but the invention disclosed herein is not limited to this configuration. For example, the books may be shared for each predetermined unit such as a team 30a or a guild. By employing the structure in which the books are shared and the rewards are given for each predetermined unit, the acquired reward can be preferentially given to a weak player character, thereby enhancing the total power of a guild. When properties are set, it is possible to effectively utilize the rewards by preferentially giving a reward to a player character having an attribute corresponding to the attribute of the reward. By employing this configuration, it is possible to add a depth to game strategy. When to give a reward to which player character in a guild can be determined at a predetermined timing, for example, by a leader of the guild.

The above-mentioned embodiment describes that the number of books is added using the book panels 62 and 72, but the invention disclosed herein is not limited to this configuration. For example, on the basis of the type of a ticket, the story may be changed to a story of exploring a cave corresponding the type and the number of jewels (first object) hidden in a treasure box found in the cave may be added. When all the treasure boxes in which jewels are hidden are found, or when an item for coming out of the cave is found from a treasure box, the process of adding the jewels may be terminated.

The above-mentioned embodiment describes that the reward giving process (function) is performed by a native application in a mobile terminal 30, but the invention disclosed herein is not limited to this configuration. The process (function) may be performed by a web application in the server device 10, or the process may be distributed to the mobile terminal 30 and the server device 10 depending on the processing capability of the mobile terminal 30 and the server device 10 and the communication capability of the mobile terminal 30 and the server device 10. It is described above that the ticket storage unit 42, the book number storage unit 43, and the reward setting storage unit 44 are disposed in the mobile terminal 30, but all the constituent units may be disposed in the server device 10 or may be distributed to the mobile terminal 30 and the server device 10.

The above-mentioned embodiment describes that the numerical value by which the number of books accumulated is multiplied is set as the change value correlated with the chance-up panel 81, but the invention disclosed herein is not limited to this configuration. For example, a numerical value by which the number of books accumulated is divided may be set as the change value. Accordingly, for example, in the chance-up panel screen 80 illustrated in FIG. 11, two chance-up panels 81 among three chance-up panels 81 may be correlated with a numerical value as a multiplier and one chance-up panel 81 may be correlated with a numerical value as a divisor. When a numerical value as a divisor is set as the change value and a player turns over the chance-up panel 81 correlated with the numerical value as a divisor, it is a disappointing result (the number of books accumulated is 1 over a predetermined number) for the player. Accordingly, when one chance-up panel 81 is determined out of three chance-up panels 81 and the determined chance-up panel 81 is turned over, the player does not know the result and is excited, thereby enhancing an interest. When the chance-up panel 81 correlated with the numerical value as a divisor is turned over, performance of displaying a skull on the chance-up panel 81 and outputting predetermined music, or the like may be performed by the mobile terminal 30. As the change value, a numerical value to be added to or subtracted from the number of books accumulated may be correlated with the chance-up panels 81. By correlating various change values (×, ÷, +, −) with the chance-up panels 81, it is possible to further raise a player's excited feeling.

DESCRIPTION OF REFERENCE NUMERALS

1: game system
10: server device
11: control unit
14: storage unit
21: game control program (web application)
30: mobile terminal (information processing device)
31: control unit
41: game control program (native application)
42: ticket storage unit
43: book number storage unit
44: reward setting storage unit
50: event top screen
60: red panel
62: red book panel
65: chance-up panel button
70: blue panel
72: blue book panel
80: chance-up panel screen
81: chance-up panel

What is claimed is:

1. A method of providing a game to a user by circuitry, comprising:
  displaying, on a touch panel display, a plurality of first objects that correspond to an item acquisition right the user has, wherein each of the first objects is correlated with a number of items defined in the game;
  responsive to detecting a first touch input on the touch panel display from the user, identifying one or more of the first objects and changing an appearance of each of the one or more of the first objects, wherein the first touch input corresponds to a location of the one or more of the first objects on the touch panel display;
  determining a first number of items based on the one or more of the first objects, wherein the first number of items is a number for determining a number of items that will be obtained by the user;

displaying, on the touch panel display, a plurality of second objects, wherein each of the second objects is correlated with a change value;

responsive to detecting a second touch input on the touch panel display from the user, identifying one of the second objects and changing an appearance of the identified second object, wherein the second touch input corresponds to a location of the one of the second objects on the touch panel display;

changing the first number of items to a second number of items based on the change value correlated with the identified second object, wherein the second number of items is a number of items that will be obtained by the user; and changing a number of items held by the user and corresponding to the item acquisition right based on the second number of items.

2. The method according to claim 1, wherein changing the appearance of each of the one or more of the first objects includes displaying the one or more of the first objects in a form that visually reveals the number of items correlated with each of the one or more of the first objects, and changing the appearance of the identified second object includes displaying the identified second object in a form that visually reveals the change value correlated with the identified second object.

3. The method according to claim 2, wherein displaying the plurality of first objects includes displaying the plurality of first objects in a form that visually conceals the number of items correlated with each of the one or more of the first objects, and displaying the plurality of second objects includes displaying the plurality of second objects in a form that visually conceals the change value correlated with each of the plurality of second objects.

4. The method according to claim 1, further comprising controlling, by the circuitry, a communication interface to receive an indication that indicates a reward for the user over a communication network, wherein the indicated reward is based on the number of items held by the user and corresponding to the item acquisition right.

5. The method according to claim 1, wherein the plurality of second objects includes a second object that is correlated with the change value of onefold and is not selectable by the user.

6. The method according to claim 1, wherein changing the first number of items to the second number of items includes calculating the second number of items by arithmetic operations of the first number of items and the change value.

7. The method according to claim 1, wherein determining the first number of items includes determining the first number of items by adding the numbers of items correlated with the one or more of the first objects, at least one of the plurality of first objects is correlated with termination information that indicates termination of adding the numbers of items, and the method further comprises responsive to the first object correlated with the termination information being selected by the user, rendering the remaining first objects to be unselectable by the user.

8. A non-transitory computer-readable medium that stores instructions for providing a game to a user which, when executed by circuitry, cause the circuitry to:

display, on a touch panel display, a plurality of first objects that correspond to an item acquisition right the user has, wherein each of the first objects is correlated with a number of items defined in the game;

responsive to detecting a first touch input on the touch panel display from the user, identify one or more of the first objects and change an appearance of each of the one or more of the first objects, wherein the first touch input corresponds to a location of the one or more of the first objects on the touch panel display;

determine a first number of items based on the one or more of the first objects, wherein the first number of items is a number for determining a number of items that will be obtained by the user;

display, on the touch panel display, a plurality of second objects, wherein each of the second objects is correlated with a change value;

responsive to detecting a second touch input on the touch panel display from the user, identify one of the second objects and change an appearance of the identified second object, wherein the second touch input corresponds to a location of the one of the second objects on the touch panel display;

change the first number of items to a second number of items based on the change value correlated with the identified second object, wherein the second number of items is a number of items that will be obtained by the user; and change a number of items held by the user and corresponding to the item acquisition right based on the second number of items.

9. The non-transitory computer-readable medium according to claim 8, wherein the instructions, when executed by the circuitry, further cause the circuitry to display the one or more of the first objects in a form that visually reveals the number of items correlated with each of the one or more of the first objects; and display the identified second object in a form that visually reveals the change value correlated with the identified second object.

10. The non-transitory computer-readable medium according to claim 9, wherein the instructions, when executed by the circuitry, further cause the circuitry to display the plurality of first objects in a form that visually conceals the number of items correlated with each of the one or more of the first objects; and display the plurality of second objects in a form that visually conceals the change value correlated with each of the plurality of second objects.

11. The non-transitory computer-readable medium according to claim 8, wherein the instructions, when executed by the circuitry, further cause the circuitry to control a communication interface to receive an indication that indicates a reward for the user over a communication network, wherein the indicated reward is based on the number of items held by the user and corresponding to the item acquisition right.

12. The non-transitory computer-readable medium according to claim 8, wherein the plurality of second objects includes a second object that is correlated with the change value of onefold and is not selectable by the user.

13. The non-transitory computer-readable medium according to claim 8, wherein the instructions, when executed by the circuitry, further cause the circuitry to calculate the second number of items by arithmetic operations of the first number of items and the change value.

14. The non-transitory computer-readable medium according to claim 8, wherein the instructions, when executed by the circuitry, further cause the circuitry to
- determine the first number of items by adding the numbers of items correlated with the one or more of the first objects, wherein at least one of the plurality of first objects is correlated with termination information that indicates termination of adding the numbers of items; and
- responsive to the first object correlated with the termination information being selected by the user, render the remaining first objects to be unselectable by the user.

15. A device providing a game to a user and comprising circuitry configured to:
- display, on a touch panel display, a plurality of first objects that correspond to an item acquisition right the user has, wherein each of the first objects is correlated with a number of items defined in the game;
- responsive to detecting a first touch input on the touch panel display from the user, identify one or more of the first objects and change an appearance of each of the one or more of the first objects, wherein the first touch input corresponds to a location of the one or more of the first objects on the touch panel display;
- determine a first number of items based on the one or more of the first objects, wherein the first number of items is a number for determining a number of items that will be obtained by the user;
- display, on the touch panel display, a plurality of second objects, wherein each of the second objects is correlated with a change value;
- responsive to detecting a second touch input on the touch panel display from the user, identify one of the second objects and change an appearance of the identified second object, wherein the second touch input corresponds to a location of the one of the second objects on the touch panel display;
- change the first number of items to a second number of items based on the change value correlated with the identified second object, wherein the second number of items is a number of items that will be obtained by the user; and
- change a number of items held by the user and corresponding to the item acquisition right based on the second number of items.

16. The device according to claim 15, wherein the circuitry is further configured to
- display the one or more of the first objects in a form that visually reveals the number of items correlated with each of the one or more of the first objects; and
- display the identified second object in a form that visually reveals the change value correlated with the identified second object.

17. The device according to claim 16, wherein the circuitry is further configured to
- display the plurality of first objects in a form that visually conceals the number of items correlated with each of the one or more of the first objects; and
- display the plurality of second objects in a form that visually conceals the change value correlated with each of the plurality of second objects.

18. The device according to claim 15, wherein the circuitry is further configured to
- control a communication interface to receive an indication that indicates a reward for the user over a communication network, wherein the indicated reward is based on the number of items held by the user and corresponding to the item acquisition right.

19. The device according to claim 15, wherein
the plurality of second objects includes a second object that is correlated with the change value of onefold and is not selectable by the user.

20. The device according to claim 15, wherein the circuitry is further configured to
calculate the second number of items by arithmetic operations of the first number of items and the change value.

21. The device according to claim 15, wherein the circuitry is further configured to
- determine the first number of items by adding the numbers of items correlated with the one or more of the first objects, wherein at least one of the plurality of first objects is correlated with termination information that indicates termination of adding the numbers of items; and
- responsive to the first object correlated with the termination information being selected by the user, render the remaining first objects to be unselectable by the user.

* * * * *